Jan. 1, 1957  J. T. DAVIDSON  2,775,932
RECORD MAKING APPARATUS
Filed March 9, 1951  11 Sheets-Sheet 1
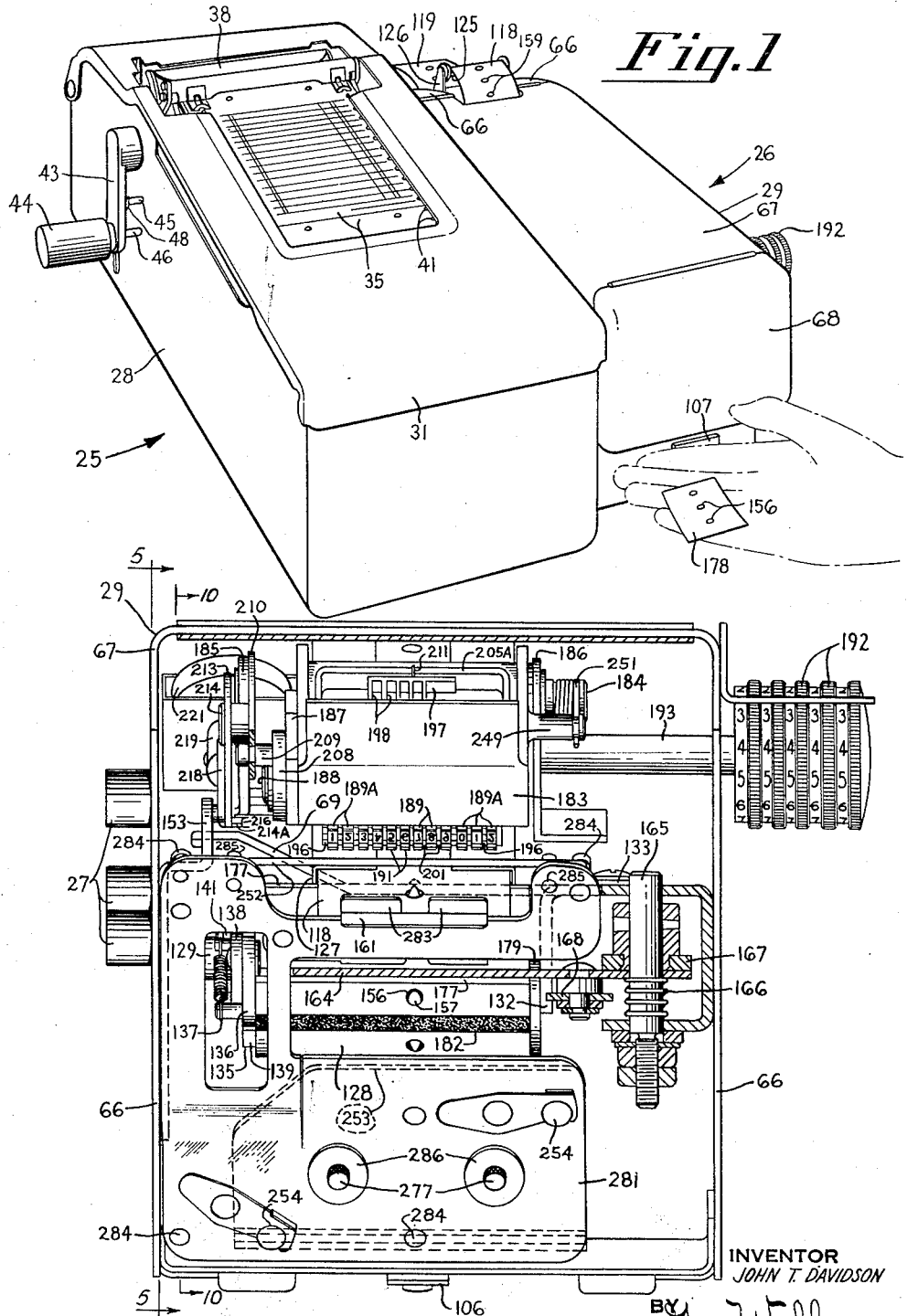
INVENTOR
JOHN T. DAVIDSON
BY Tom Walker
ATTORNEY Jan. 1, 1957  J. T. DAVIDSON  2,775,932
RECORD MAKING APPARATUS
Filed March 9, 1951  11 Sheets-Sheet 2
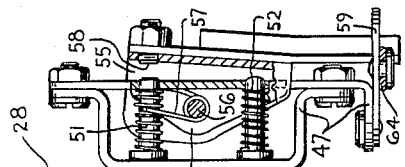
Fig. 3
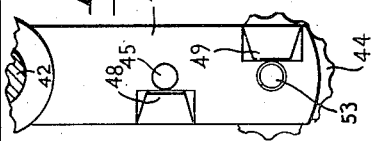
Fig. 9
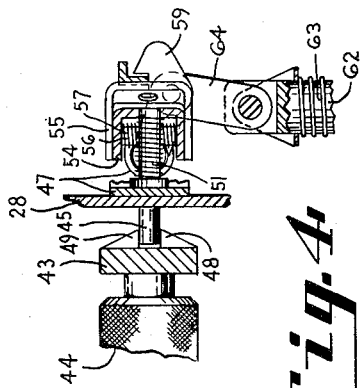
Fig. 4
Fig. 2
INVENTOR
JOHN T. DAVIDSON
BY Tom Walker
ATTORNEY

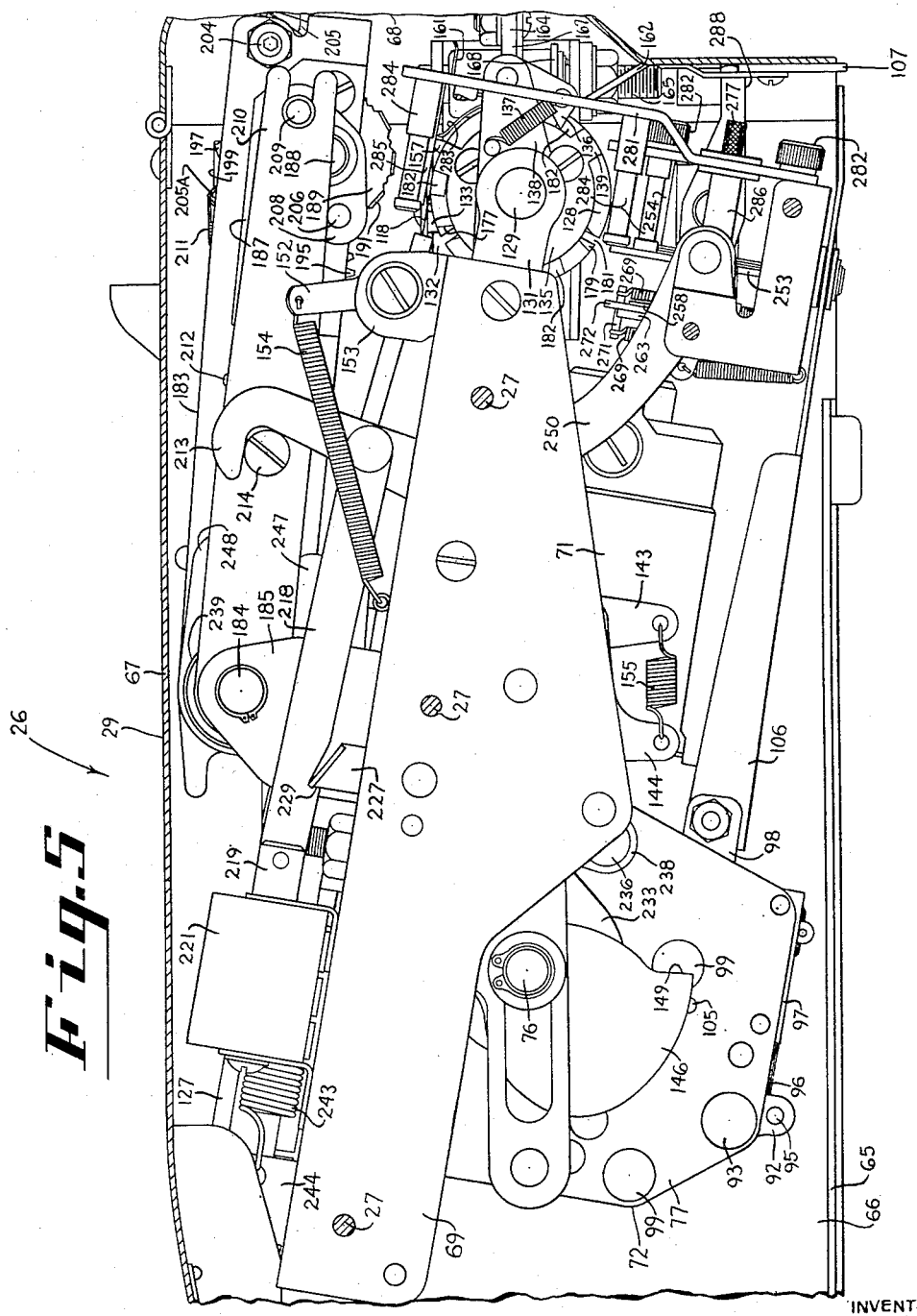

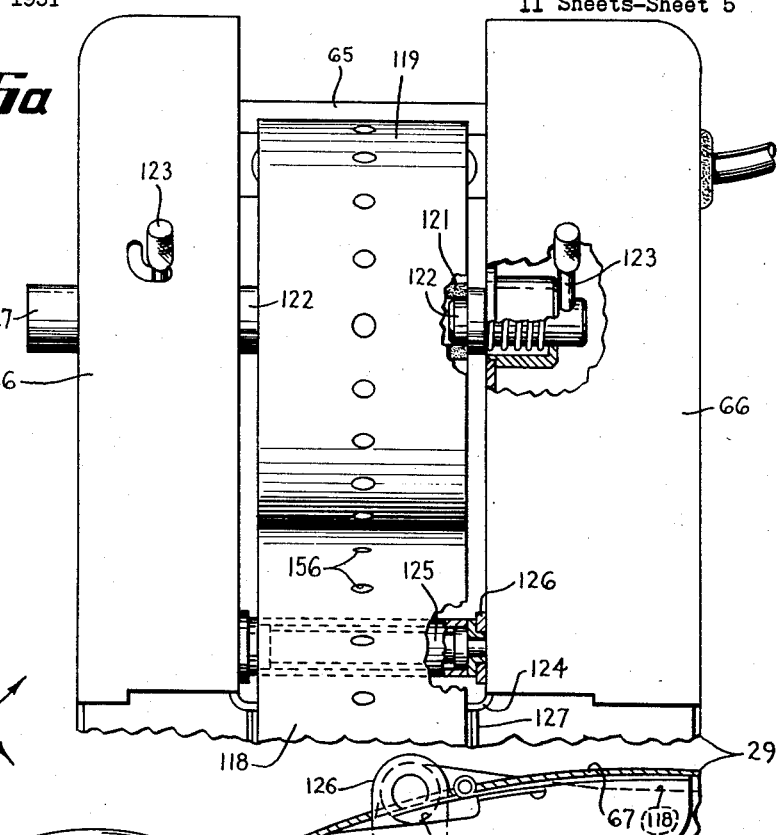
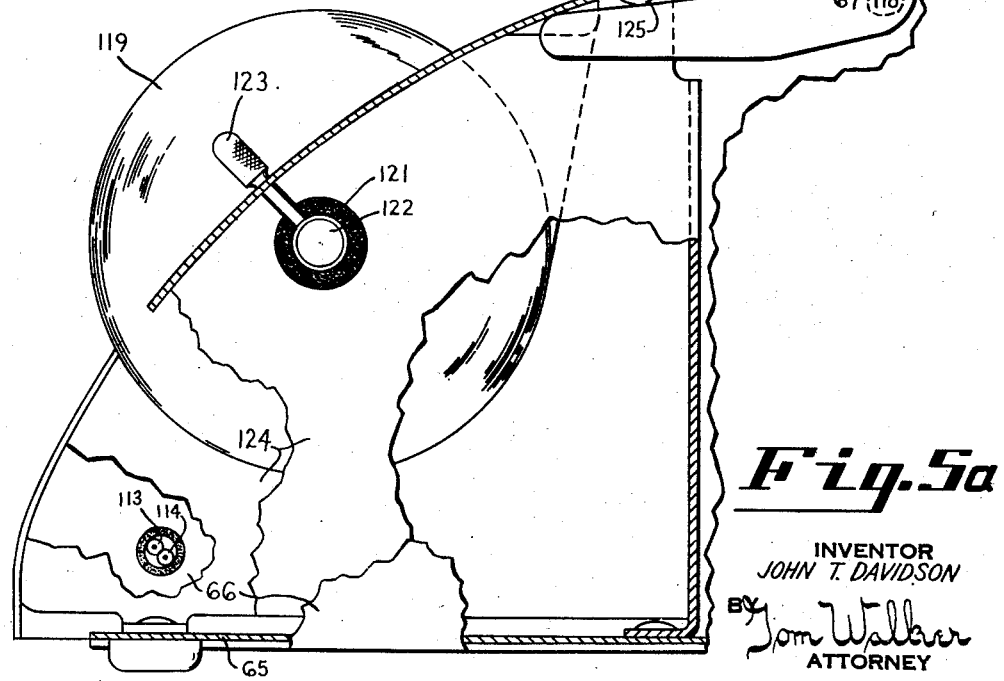

Jan. 1, 1957
J. T. DAVIDSON
2,775,932
RECORD MAKING APPARATUS
Filed March 9, 1951
11 Sheets-Sheet 6
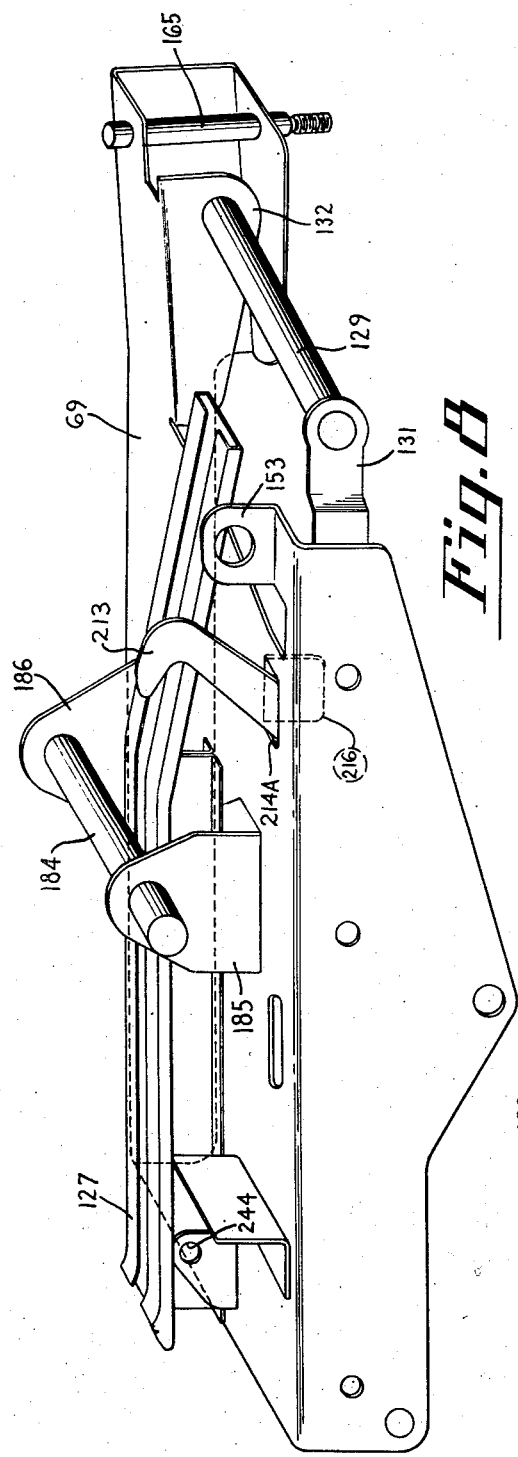
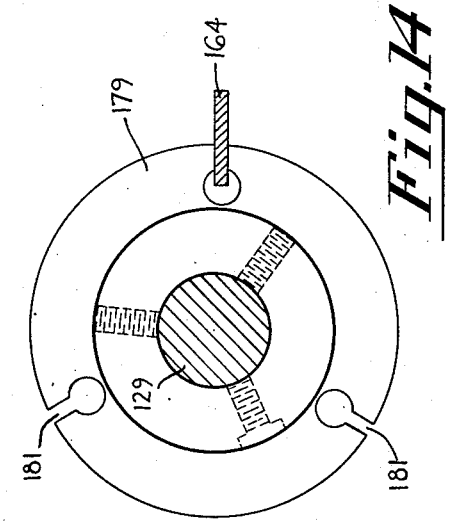
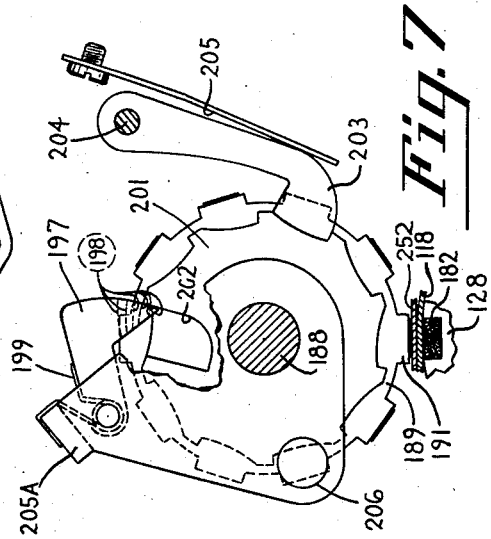
INVENTOR
JOHN T. DAVIDSON
BY
Tom Walker
ATTORNEY

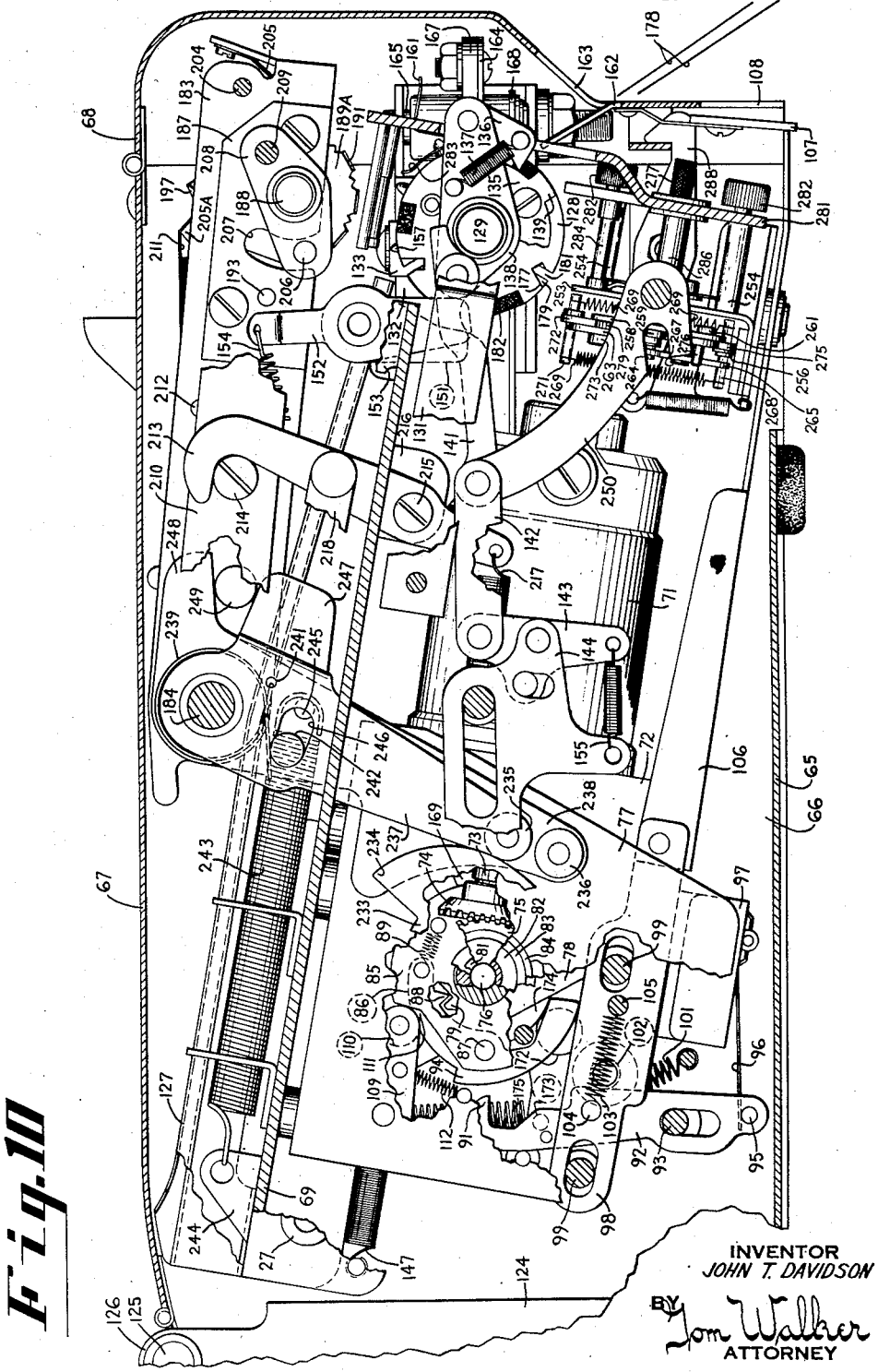

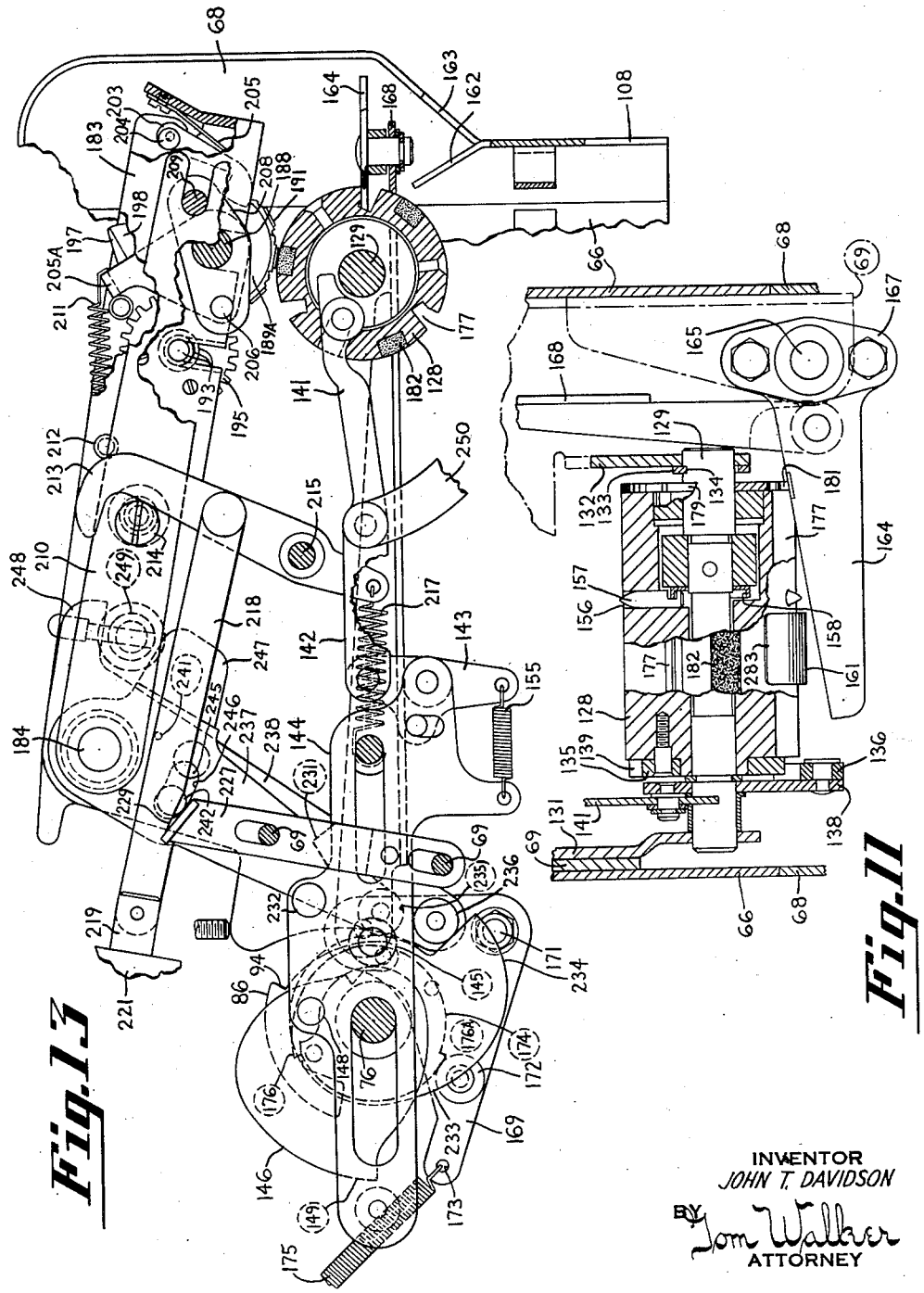

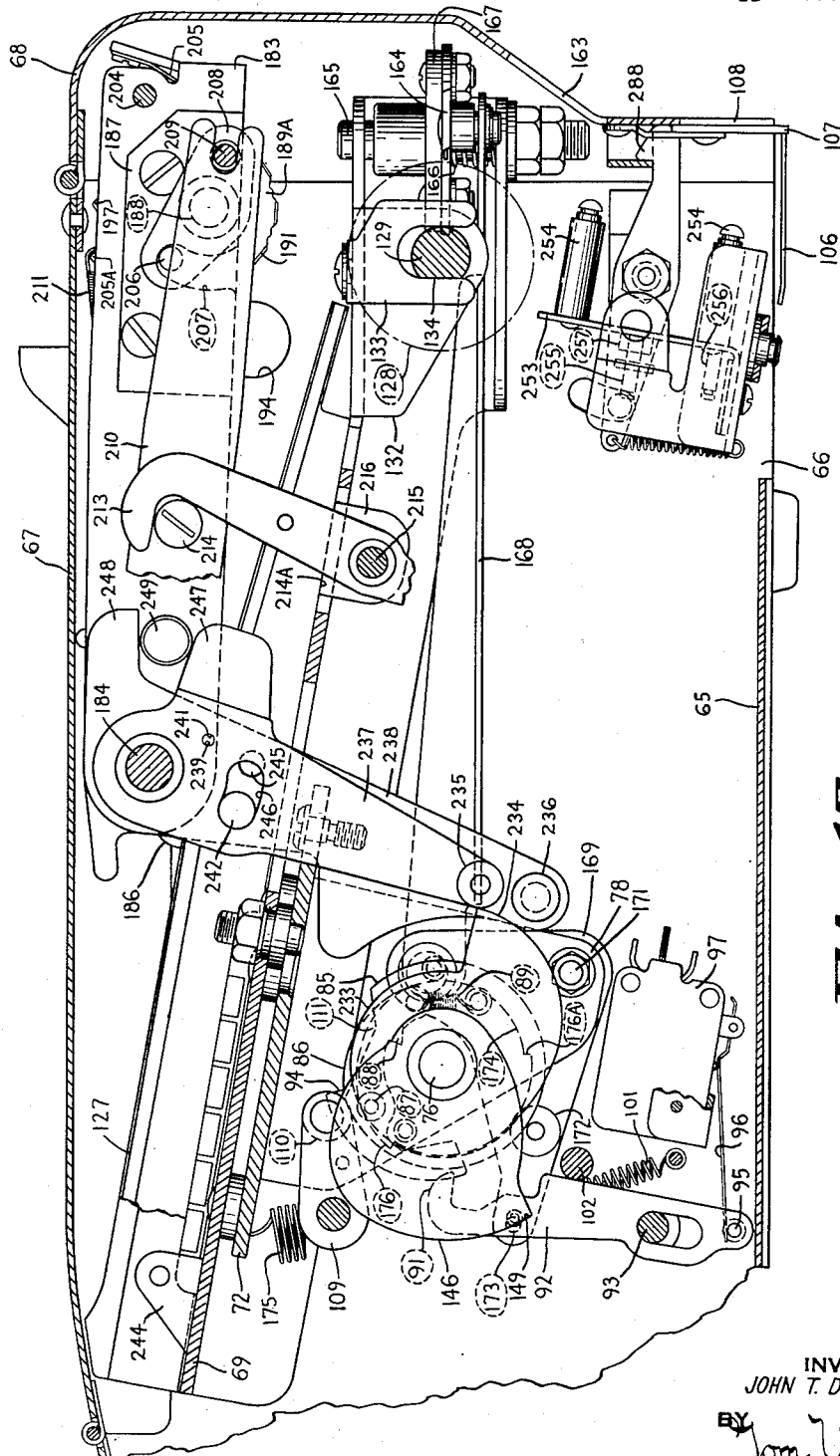
Jan. 1, 1957     J. T. DAVIDSON     2,775,932
RECORD MAKING APPARATUS
Filed March 9, 1951     11 Sheets-Sheet 9
INVENTOR
JOHN T. DAVIDSON
BY Tom Walker
ATTORNEY Jan. 1, 1957 J. T. DAVIDSON 2,775,932
RECORD MAKING APPARATUS
Filed March 9, 1951 11 Sheets-Sheet 10

INVENTOR
JOHN T. DAVIDSON
BY Tom Walker
ATTORNEY

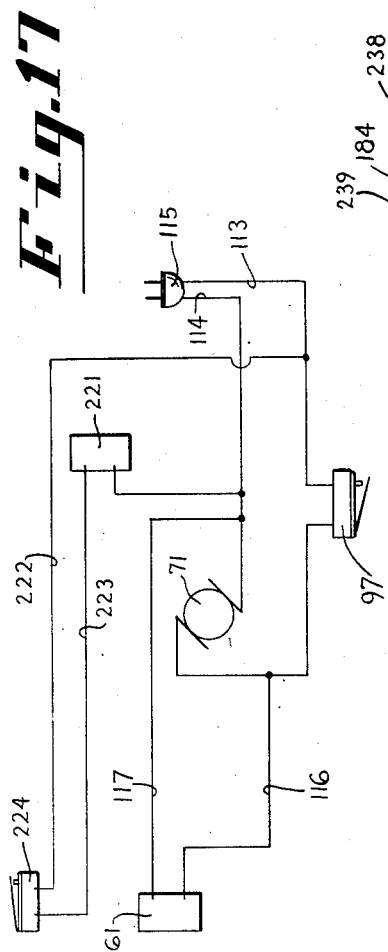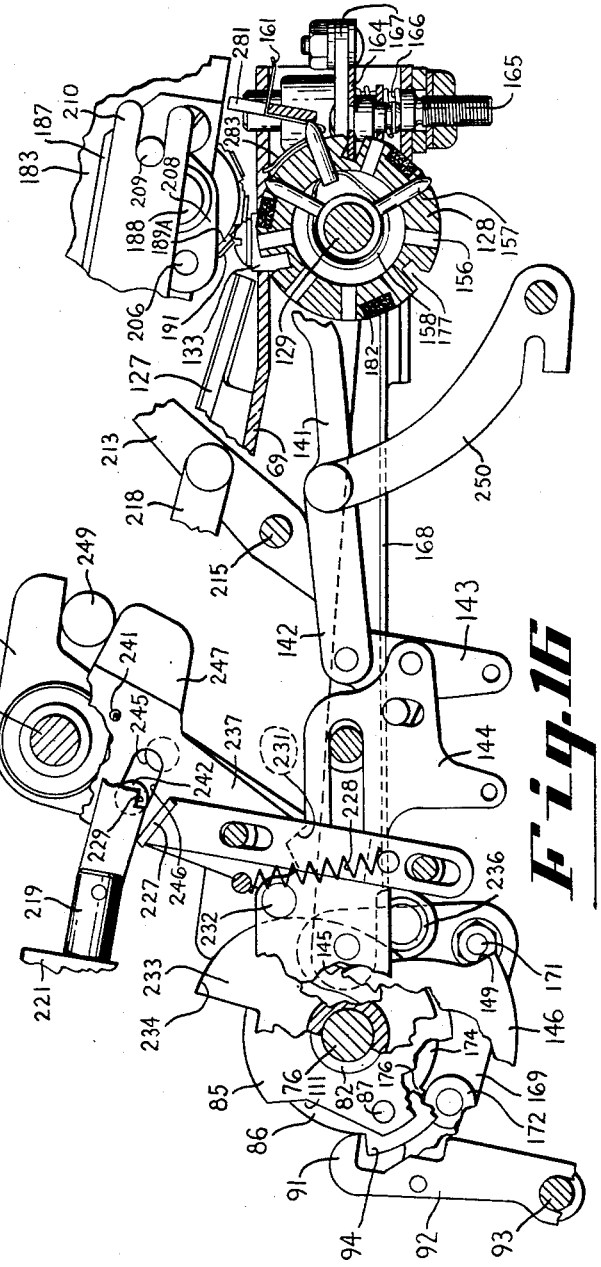

United States Patent Office 2,775,932
Patented Jan. 1, 1957

2,775,932

RECORD MAKING APPARATUS

John T. Davidson, Dayton, Ohio, assignor to The Standard Register Company, Dayton, Ohio, a corporation of Ohio Application March 9, 1951, Serial No. 214,773

19 Claims. (Cl. 101—66)

This invention relates to record making apparatus, and more particularly to an autographic register and associated ticket issuing machine for the performance of a unitary function in certain customer service trades such as dry cleaning, shoe repair, will call and layaway departments and the like.

In all such trades, in the initial transaction between clerk and customer, the clerk issues to the customer a serially numbered receipt for the goods left and then places with the goods a correspondingly numbered receipt for the goods left and then places with the goods a correspondingly numbered tag or ticket which remains with them until the goods are claimed by the customer. The ticket is ordinarily hand marked and it is necessary to prepare duplicate tickets when the goods comprise more than one garment or article.

Thus the object of the present invention is to improve the construction as well as the means and mode of operation of recording apparatus, whereby it may not only be economically manufactured, but will be more efficient and fool-proof in use, adaptable to a wide variety of applications, having relatively few parts, and be unlikely to get out of repair.

It is a further object of this invention generally to simplify and mechanize the preparation of identification tickets, as described, by providing a machine which when operated will print and issue a ticket bearing a number corresponding to the serial number of the receipt form issued in the last preceding operation of the autographic register which functions as a companion machine.

Another object of the invention is to provide for the issuance of tickets of uniform size and legibility and of any desired material which is flexible and relatively easily cut or severed.

A further object of the invention is to provide for interlocking connections between the ticket issuing machine and the register whereby the register may not be operated to issue a new form until at least one ticket has been issued in connection with the preceding form, and whereby the number imprinted by the ticket issuing machine will remain unchanged until a new form has been issued from the register.

Still another object of the invention is to enable the ticket machine to print and issue any number of duplicate tickets merely by repeated operation.

A still further object of the invention is to provide for the printing and issuing of tickets from a continuous strip of material.

A still further object of the invention is to utilize in connection with the advancement of the strip of ticket material the principle of pin wheel feed, the strip being perforated for cooperative engagement with the feed devices.

A still further object of the invention is to provide for automatic printing, severing and issuance of the ticket, and advancement of the ticket supply strip, all in one cycle of machine operation and in response to the actuation of a single machine control.

A further object of the invention is to provide a recording apparatus of the character described, having the advantageous structural features, inherent meritorious characteristics and mode of operation hereinafter set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the drawings, wherein is illustrated the preferred but obviously not necessarily the only form of embodiment of the invention, Fig. 1 is a view in perspective of record making apparatus in accordance with the instant invention, including both the register and the ticket issuing machine;

Fig. 2 is a view in side elevation of the register, with the side wall removed;

Fig. 3 is a fragmentary detail view in cross section of the register, showing the latching devices for controlling operation of the form issuing crank;

Fig. 4 is a detail view of the latch of Fig. 3;

Fig. 5 is a side view of the ticket issuing machine with the sidewall removed;

Fig. 5A is a continuation of Fig. 5;

Fig. 6A is a continuation of Fig. 6;

Fig. 7 is a detail view in side elevation of a printing disc in the ticket machine;

Fig. 8 is a view in perspective of the main frame of the ticket machine, showing some of the principal elements supported thereby;

Fig. 9 is a detail view of the register crank, looking at the inner surface thereof;

Fig. 10 is a view in side elevation of the ticket machine, portions being removed or broken away and the parts being shown in their normal position;

Fig. 11 is a top fragmentary view of the platen and ticket severing means in the ticket machine;

Fig. 12 is a view similar to Fig. 10 but with the printing yoke elevated to advance the printing discs;

Fig. 13 is a detail view in side elevation of some parts of the ticket issuing machine, showing the parts at the printing operation;

Fig. 14 is a detail view of a locking plate on the platen;

Fig. 15 is a detail view in side elevation of some parts of the ticket issuing machine, showing the parts midway in the operational cycle;

Fig. 16 is like Fig. 15, showing the parts just prior to reaching the normal or home position;

Fig. 17 is a wiring diagram;

Fig. 18 is a front view of the ticket machine with the front cover removed;

Fig. 19 is a fragmentary top plan view of the motor and clutch mechanisms in the ticket machine; and Fig. 20 is a detail view of the ribbon reverse mechanism.

Like parts are indicated by similar characters of reference throughout the several views.

Figure 6:
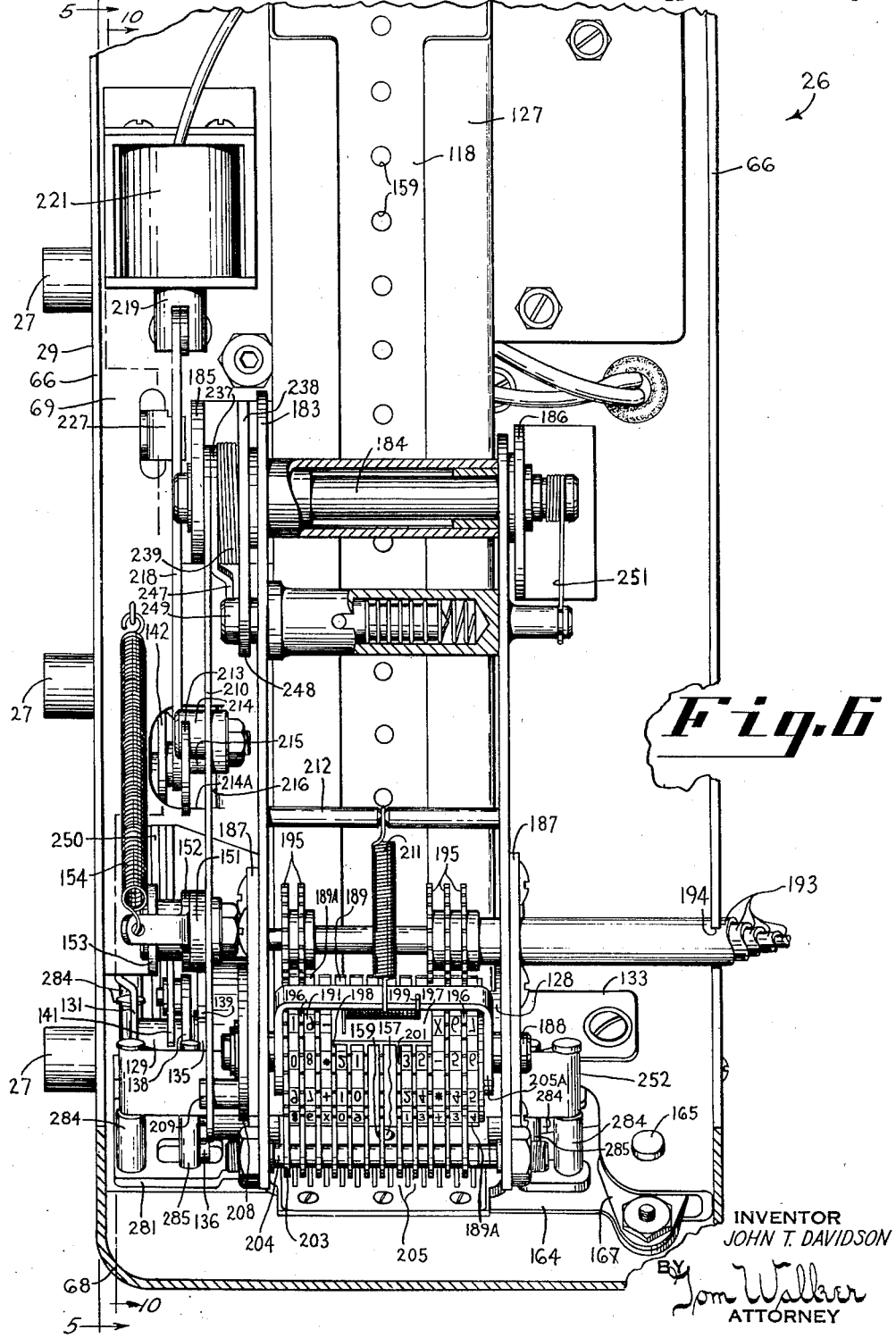
Fig. 6 is a plan view of the ticket machine with the lid removed.

Referring to Fig. 1, a combination of an autographic register 25 and ticket issuing machine 26 in accordance with the instant invention is there shown, the two machines being arranged in side by side relation and in the illustrated instance physically joined together by tenons 27 (Figs. 6 and 6A) extending between the respective cabinets 28 and 29.

The register 25 is generally conventional in structure and mode of operation, being comprised of the cabinet or case 28, the top of which is closed by a lid 31 hinged at one end to the case 28. The lid 31 has openings to expose a writing table 32 (Fig. 2) pivotally connected to brackets 33 at the opposite end of the register. From a supply pack 34 in the case 28, series connected record forms 35 are passed around an idler 36 on the table 32. Successive sets of forms 35 thereby are exposed upon the table 32 for writing or record making thereon, and then are isued from the machine or directed into a storage compartment 37, as determined by the position of a flutter plate 38. Advancement of the record forms is accomplished by pin wheels 39 on opposite sides of the register engaging marginal perforations 41 in the forms.

The pin wheels 39 are fixed to a shaft 42 which is journaled between the side walls of the case 28 and which at its left hand end projects through the case and has secured thereto a crank 43 provided with a cylindrical, axially movable handle 44. The crank 43 is shown in its normal position in Fig. 1. One complete rotation thereof is effective to fully advance one set of forms from writing position and to bring the succeeding set of forms into writing position. The crank 43 is held against inadvertent operation by a pair of vertically spaced apart plungers 45 and 46, supported by a two-part bracket 47 (Fig. 3) just inside the case 28, the plungers projecting through the case and being positioned for alignment with the crank 43 when it is in its suspended or normal position.

Cooperating with the plunger 45 is a lobe 48 (Fig. 9) rounded or cam shaped on one side and formed as a flat abutment on the other side, the flat portion of the lobe normally lying adjacent the plunger 45 and in front thereof. The plunger 46 is in cooperative relation with a similar lobe 49 on the crank 43, the lobe 49, however, being longitudinally offset and reversely arranged with respect to the lobe 48. Thus plunger 45 locks the crank 43 against retrogade or counter-clockwise motion as viewed in Fig. 9 while plunger 46 locks the crank against forward or clockwise motion as viewed in Fig. 9.

The plungers 45 and 46, as shown in Fig. 3, are urged by compression springs 51 and 52 outward, or toward the left as seen in Fig. 3, and so normally assume positions latching the crank 43 against operation. Release of the crank is effected by pressing the handle 44 axially inward, a pin 53 carried by the handle engaging the plunger 46 and pushing it out of the path of the lobe 49. Immediately the crank passes out of alignment with the plunger 46, the plunger is returned outward by the spring 52 and so is in position to arrest the crank after it has completed one revolution. Near the end of such revolution, the rounded or cam surface of lobe 48 engages the plunger 45 which moves yieldingly inward to allow the lobe to pass by and then returns outward to the latching position of Fig. 9.

In accordance with the instant invention, the locking devices for the register crank are modified to preclude successive form issuing operations of the register without an intervening operation of the ticket issuing machine. According to such modified structure, the two-part bracket 47 has a channel shaped portion 54 embraced by a similar formation on a locking plate 55. A cross pin 56 extends transversely through the described portions of the members 54 and 55 and provides a pivotal mounting for the locking plate. A torque spring 57 on the pin 56 is arranged to urge the plate 55 in a counter-clockwise direction as viewed in Fig. 3, which motion is limited by an adjustable set screw 58 on the upper end of the plate. The locking plate lies in back of the pins 45 and 46 in position to be engaged by the plunger 45 above the pivot pin 56 and below its pivot by the plunger 46. The construction and arrangement of parts is such that the plate 55 normally lies out of the path of movement of the plunger 46 by reason of the urging of the torque spring 57. Accordingly, the normal latching and releasing functions of the plunger 46 as above described are unimpeded. Should the plate 55, however, be rocked in a clockwise direction against the influence of spring 57 it will assume the position illustrated in Fig. 3 wherein inward motion of the plunger 46 is blocked thereby.

Blocking of the inward motion of plunger 46 is effective of course to preclude the normal disabling of this plunger by inward movement of the crank handle 44 and so is effective to prevent operation of the crank and issuance of the forms. The locking plate is moved to blocking position once each revolution of the crank 43 by the plunger 45 as it is cammed inward by the crank lobe 48. It is alternately held in and released from such position by a latch 59 (see Fig. 4) pivotally connected to the bracket 47 and engageable with the lower end of plate 55. The latch 59 is controlled by an electromagnetic solenoid 61, the plunger 62 of which is urged outwardly by a spring 63 and connected to the latch 59 by a link 64. When the solenoid 61 is deenergized, as in Figs. 2–4, plunger 62, link 64 and latch 59 are extended outward, with the latch in position to engage the locking plate 55. Assuming the locking plate to be so held and engaged, the register is locked from operation until the solenoid 61 is energized. When that occurs, plunger 62, link 64 and latch 59 are retracted to release the plate 55 which immediately rocks out of blocking position under the influence of spring 57. The crank handle 43 now is released for operation. When so operated, and near the end of the single revolution permitted it, the crank acts through the lobe 48 and plunger 45 to rock the plate 55 back to blocking position where it may be reengaged and held by latch 59, assuming that in the intervening period of time the solenoid 61 has been deenergized.

The energizing and deenergizing of the solenoid 61 is a function of the operation of the ticket issuing machine 26, as will appear from the following particular description of such machine.

In such machine, the aforementioned case 29 is made up of a base 65 (Figs. 5–5A), side walls 66 (see Figs. 6–6A), a lid 67 (Fig. 1) and a front cover 68, the lid and front cover being hinged to the side walls so that they may be raised for access to the machine. Within the case and consituting the principal mounting support for the parts of the machine, is a frame 69 shown in detail in Fig. 8. The frame 69 has an irregular formation but is essentially channel shaped with the turned down side walls thereof being bolted to the side walls 66.

Power for operation of the machine 26 is derived from an electric motor 71 (Figs. 10 and 19) supported by a bracket 72 made fast to the underside of the frame 69. The motor drives a shaft 73 to which is secured a bevel gear 74 meshing with a similar gear 75 mounted for relative rotary motion on a shaft 76 supported between side walls 77 and 78 of the channel shaped bracket 72. The bevel gear 75 has fixed thereto a ratchet 79 and is confined against axial motion along the shaft 76 by a spacer sleeve 81 on one side thereof and a hub 82 on the other side thereof, the latter being fixed to the shaft 76 and carrying a sleeve 83 rotatable in a bracket mounted bushing 84. The hub 82 has secured thereto a clutch disc 85 positioned alongside the ratchet 79 and carrying on its side a pawl 86 lying in the same vertical plane as the ratchet. The pawl 86 is pivotally connected at 87 to the disc 85 and presents a tooth 88 for engagement with the ratchet 79. The pawl is urged about pivot 87 by a coil spring 89 so as to engage the tooth 88 with the ratchet 79. It will be apparent that when pawl 86 is so engaged with ratchet 79 a driving connection is established from the motor 71 to the shaft 76 and that when pawl 86 is disengaged the driving connection so established is interrupted.

The pawl 86 is normally disengaged from the ratchet 79, it being so held by a finger 91 on a lever 92 mounted on a stud 93 on the bracket wall 77 for motion in both a rotary and a sliding sense. Rotary or rocking motion of the lever 92 is utilized to control the engagement of the pawl 86 with the ratchet 79, the finger 91 being arranged to engage a lip 94 on the pawl. Sliding motion of the lever 92 is utilized, through a stud 95 on the lower end thereof and an arm 96, to control a microswitch 97. The switch 97 is of the normally closed variety and is opened by an upward motion of the lever 92 from the position of Fig. 10, as is effected by engagement of the lip 94 on pawl 86 with the finger 91 while the clutch disc 85 is rotating. Downward motion of the lever 92 to the position of Fig. 10 allows the switch actuating arm 96 to rock outward or downward whereupon the switch 97 assumes its normally closed position.

Rotary or rocking motion of the lever is a function of the movements of an actuating link 98 slidably mounted on studs 99 on the wall 77 and of a spring 101 anchored to the wall 77 and urging the lever both downward and in a rotary clockwise direction. The link 98 carries a roller 102 bearing on the front or right hand edge of the lever 92. A spring 103, tensioned between a stud 104 on the link 98 and a stud 105 on wall 77 urges the link forwardly or leftwardly, with the spring 101 acting to urge the lever 92 in a following direction. The link 98 is connected to a longer link 106 which extends forwardly in the machine with its front end abutting a flexible lever 107 attached at its upper end to the interior of the front cover 68. The lever 107 is accessible through an opening 108 in the cover 68 to be normally pressed inward and thereby shift the links 106 and 98 axially rearward against the urging of spring 103. According to the construction and arrangement of parts, and assuming the pawl 86 to be held out of engagement with ratchet 79, the applying of inward pressure to the lever 107 is effective through links 106 and 98 and roller 102 to rock the lever 92 in a counter-clockwise direction, substantially to the position shown in Fig. 10. Finger 91 thereon accordingly releases pawl 86 which drops into engagement with the ratchet 79. At the same time, spring 101 pulls the lever 92 downward and effects the closing of switch 97. So long as the lever 107 is held depressed or pressed inward this position of the parts prevails and the motor 71 and shaft 76 may pass through successive revolutions. When the lever 107 is released, the spring 103 is enabled to draw the link 98 forwardly and allow the lever 92 to rock forwardly into the path of motion of lip 94 on the clutch pawl 86. Now as the lip 94 reaches the lever finger 91 the lever is drawn upward to open switch 97, and, at the limit of such motion, constrains the pawl 86 to rock out of engagement with ratchet 79 and so disconnect the motor 71 from the shaft 76. If the lever 107 is merely pressed inward and then promptly released it will be understood that the shaft 76 will be limited to a single revolution. A normal positioning means for the clutch disc 85, shaft 76 and associated parts is represented by a detent arm 109 pivotally mounted on the wall 77 and bearing a roller 110 adapted to engage a complementary notch 111 in the periphery of the disc 85. A spring 112 urges the arm 109 in a direction to retain the roller 110 on the periphery of the disc 85.

Referring to the wiring diagram of Fig. 7, the switch 97 referred to in the preceding paragrahps is interposed in series relation with the motor 71 in an electrical circuit comprising conductors 113 and 114 extending from a plug 115 connected to a source of 110 volt alternating current. Closing of the switch 97, therefore, energizes the motor 71 and opening of the switch deenergizes the motor. Also connected across the conductors 113 and 114, through leads 116 and 117 is the previously considered electromagnetic solenoid 61. Closure of the switch 97, therefore, also results in energizing of the solenoid 61 and releasing of the register 25 for issuance of a form, as previously described.

The machine 26 operates upon ticket material in the form of a strip 118 contained in a coil or roll 119 (see Figs. 5–5A and 6–6A). The roll 119 is wound on a spool 121, the opposite ends of which receive spring pressed spindle supports 122 which may be retracted by pins 123 in a conventional manner. The roll 119 is contained in a well 124 formed centrally of the machine and rearwardly thereof by the casing walls 66. The leading end of the strip 118 extends from the roll 119 forwardly over a roller 125 mounted on a wall supported bracket 126 and projects into and through a chute 127 toward the front of the machine. The chute 127 is supported on the top of the frame member 69 and at its front end terminates in adjacent overlying relation to a platen cylinder 128 (Fig. 5).

The cylinder 128 is rotatably mounted on a shaft 129 supported between projecting arms 131 and 132 (see Fig. 8) on the frame 69. One projecting end of the shaft 129 is embraced by a bracket 133 (Fig. 12) fast on the frame 69 and having a surface complementary to a flat 134 on the shaft whereby to prevent rotation of the shaft. An intermittent step-by-step rotation of the cylinder 128 is provided for, there being mounted on one end of the cylinder a ratchet 135 (Fig. 15) the periphery of which is continuously engaged by a pawl 136 under influence of a spring 137 tensioned between the pawl and the carrier 138 upon which it is mounted. The pawl 136 is engageable with successive teeth 139 in a series of three equidistantly spaced about the periphery of the ratchet 135.

The carrier 138 is rotatably mounted on the shaft 129 with its opopsite ends lying on opopsite sides thereof. At one end is the pawl 136. At the other end is pivotally connected a link 141 which with the link 142 forms a toggle connection connected through an excess motion absorbing arm 143 with a slide 144 supported by the frame 69 and the shaft 76 for relative sliding motion. The slide 144 has a roller 145 thereon riding the periphery of a cam 146 fast on the shaft 76, and is urged rearwardly or in a direction to maintain the roller in contact with the cam by a spring 147 anchored to the frame 69 and connected to a stud 148 on the slide (see Fig. 13). The cam 146 presents a gradually rising and sharply dropping off high point 149 which as it passes the roller 145 moves the slide 144 and associated linkage leading to pawl carrier 138 forwardly or to the right. In the course of such motion the carrier 138 rocks about the shaft 129, and, acting through the pawl 136 turns the ratchet 135 and the cylinder 128 to which it is attached approximtaely one-third of a revolution in a clockwise direction as viewed in Fig. 15. Return of the actuating linkage under the influence of spring 147 places pawl 136 in cooperative engagement with the next following ratchet tooth 139 for another advance of the platen cylinder during the next succeeding revolution of the cam 146.

For reasons which will hereinafter more clearly appear it is desirable to limit the motion of the cylinder 128 to a precise degree of revolution upon each turn of the cam 146. Thus a stop member 151 is arranged to project into abutting relation with a ratchet tooth 139 during the rotation of the cylinder by the pawl 136. The member 151 is adjustably fastened to a control arm 152 both of which are pivotally mounted on an upstanding ear 153 on the frame 69. A tension spring 154 urges the assembly in a counter-clockwise direction with the arm 152 engaging the pawl carrier 138. When the carrier is retracted or in the position of Fig. 10 the stop member 151 is held out of cooperative relation with the ratchet 135. Motion of the carrier forward to advance the cylinder allows the member 151 to engage the ratchet periphery, and, as a tooth 139 approaches and engages the stop member rotation of the cylinder is abruptly halted. The arm 143 previously referred to, serves in this operation to absorb any overthrow of the cam 146, such motion being dissipated in a stretching of the spring 155 which connects the arm 143 to the slide 144 beneath the direct connection therebetween.

The rotary step-by-step motion of the platen cylinder 128 is utilized to effect a corresponding advance of the ticket strip 118. As shown in Fig. 16, the cylinder is hollow and formed with a series of radial openings 156 accommodating relatively movable pins 157. The pins 157 are operatively connected at their inner ends to a cam 158 fixed on the shaft 129. As the cylinder 128 rotates, the pins 157 are carried with it, and, under the influence of cam 158 assume retracted and projected positions relatively to the periphery of the cylinder. In the illustrated instance, the cam 158 is so arranged that the pins begin to project above the periphery of the cylinder just past the top center position and begin to retract at a point about 45 degrees later in the rotation of the cylinder. The pins 157 are engageable in perforations 159 in the strip 118, the leading end of which extends over the top of the cylinder 128 and down the front thereof, a guide member 161 being provided to insure an intimate contact of the strip with the surface of the cylinder. The strip 118 accordingly is advanced in step-by-step fashion in correspondence with and in harmony with the movements of the cylinder 128. Beyond the cylinder 128, the strip 118 rests on an inwardly struck portion 162 (see Fig. 15) of the front cover 68, and is guided thereby through an opening 163 in the cover.

Referring to Figs. 16 and 18, a ticket is cut off from the end of the strip 118 by a knife blade 164 mounted for pivotal, laterally swinging motion on a stud 165 supported in a substantially vertical position in spaced portions of the frame 69. A coil spring 166 urges and maintains the blade 164 seated upon a stop 167 pinned to the stud 165. As seen also in Figs. 11 and 13, there is pivotally connected to the blade 164 one end of a link 168. The link 168 extends rearwardly in the machine and is pivotally connected at its opposite end to the vertical arm of a bell crank lever 169 pivotally mounted on a stud 171 on the motor bracket 72. The horizontal arm of the lever 169 carries a roller 172 and a stud 173, the former riding the periphery of a cam 174 on the shaft 76 and the latter having a tension spring 175 connected thereto. The spring 175 is anchored on the frame 69 and acts to maintain the roller 172 on the cam 174. The cam 174 presents two lobes 176 and 176A on its periphery, these being utilized in a manner to be described to control the movements of the knife blade 164. The blade 164 severs the material of the strip 118 by being allowed to enter longitudinal grooves 177 in the surface of cylinder 128 to pass through the strip and cut off a portion thereof, which portion becomes a ticket 178 and drops through the front cover opening 163 (see Fig. 1). The grooves 177 are spaced about the periphery of the cylinder in position to be brought successively to registry with the knife blade by the step-by-step rotation of the cylinder as previously described.

Entrance of the blade into the grooves 177 also is used to hold the cylinder from motion during the printing operation to be described. For accurate positioning in this regard, the cylinder 128 has a hardened metal plate 179 (Figs. 5 and 14) fastened on one end and having approximately radial key slots 181 opening through its periphery. The plate 179 is positioned to cause the slots 181 to register with the grooves 177 in the cylinder, the slots 181 providing a more restricted path of entrance for the blade 164 into the grooves so that any yielding or slipping of the platen cylinder under impact of the printing devices is positively prevented.

Considering the action of the blade 164 in somewhat greater detail, the control cam 174 therefor has an eccentric shape in that the lobe 176 thereon is more distant from the axis of the cam than the lobe 176A. When the roller 172 reaches the lobe 176 in the clockwise rotation of shaft 76, the blade 164 is fully within groove 177. As the roller drops off lobe 176, the blade is retracted but does not wholly leave the groove 177, occupying at this time a position such as shown in Fig. 11, where the blade is still effective to lock the cylinder 128 against rotation.

The dwell upon which the roller drops from lobe 176 is concentric with or in the same radial arc as lobe 176A so that the position of blade 164 is unchanged as lobe 176A approaches the roller 172. As the roller drops off lobe 176A, however, the blade 164 is retracted out of groove 177 and frees cylinder 128 for a strip feeding motion as previously described. Continued rotation of the cam causes the blade 164 to return toward and enter a newly presented groove 177 in the cylinder 128 as the high lobe 176 approaches and reaches the roller 172.

Printing in the machine is accomplished by hammer-like blows delivered on the top of the platen cylinder 128, the cylinder being provided with three spaced apart platen inserts 182 brought successively to an approximately top center position by the indexing of the cylinder 128. The printing apparatus includes a yoke 183 (Figs. 6 and 10) pivotally mounted on a shaft 184 supported between upstanding brackets 185 and 186 on the frame 69. At its outer end the yoke 183 has plates 187 on the opposite sides thereof providing reinforced end bearings for a shaft 188 carried between the arms of the yoke. The shaft 188 has mounted thereon a series of independently rotatable printing discs 189 and 189A on the periphery of which are type lugs 191. While the type lugs may be made for printing any desired indicia in the present instance they represent numerals so arranged that each disc may print any number from zero through nine, with the series of discs thus being enabled to print any number or combination of numbers and numerical designation within the denominational limits of the unit. In the present instance the unit has twelve positions. Of these seven intermediate positions are used to print a continuously changing number while the outer three positions on one side and two on the other are used to print various code information. The code printing discs 189A are pre-set to the desired representation by a series of adjustment knobs 192 (Fig. 1) outside the machine, each connected to a respective sleeve 193 (Fig. 6). The sleeves 193 are arranged in telescoping relation and extend through a slot 194 in the upper edge of wall 66 to and through the yoke 183. Between the arms of yoke 183, the sleeves 193 separately terminate in an attachment to a respective gear 195. The gears 195 mesh with respective gears 196 on the code printing discs 189A. Accordingly, by adjustment of the knobs 192, the discs 189A may be pre-set for the repeated printing of any desired code information.

The setting of the middle discs 189 is changed upon each new issuance of forms from the register. Directly responsible for setting the discs is a pawl 197 having teeth 198, the pawl being urged by a torque spring 199 in a direction to engage the teeth 198 with respective ratchet wheels 201 fast on the side of each disc 189. The teeth 198 are, however, of graduated height so that only the tooth associated with the units denomination position normally engages its ratchet 201. As the units disc passes from nine position through zero, however, the long tooth in the units position encounters a notch 202 (Fig. 7), and, dropping therein, allows the next higher tooth on the pawl 197 to engage its ratchet 201. On the subsequent pawl advancement operation, therefore, the units disc and the one next higher are advanced in unison. It will be recognized that this is a conventional tens-carry mechanism which is repeated across the series of printing discs in response to repeated indexing of the disc in the first or units position. As shown in Figs. 6 and 7, all of the discs 189 and 189A are yieldingly held in their set positions of adjustment by detent pawls 203 pivotally mounted on a yoke supported cross bar 204 and urged to detenting position by leaf springs 205.

The pawl 197 is carried by a bail 205A which embraces and overlies the printing discs 189 and is pivotally mounted on the shaft 188. On one end thereof the bail 205A has a stud 206 (Fig. 10) extending through an arcuate slot 207 in yoke 183 and bearing plate 187 and pivotally engaged with one end of an arm 208 pivotally mounted on the shaft 188 outside the yoke 183. On the other end of arm 208, on the opposite side of the shaft 188, is a stud 209 received in the forked front end of a lever 210 (Fig. 5). The construction and arrangement of parts, assuming the lever 210 to be stationary, is such that elevating of the yoke 183 from the position of Fig. 5 to that of Fig. 12 serves to rock the bail 205A, thus actuating pawl 197 with respect to the printing discs 189. A spring 211 tensioned between the bail 205A and a cross rod 212 carried between the arms of the yoke 183 urges the bail and associated parts to the normal position of Fig. 10 and provides a force for the return of the parts from actuated position. The lever 210 extends rearwardly and is pivotally mounted on the shaft 184. By reason of its connection with bail 205A and through the tension of spring 211, the lever 210 tends to rock in unison with the yoke 183. So moving, it cannot function as a reactant member for the bail 205A so that there is no actuation of the bail and pawl 197 carried thereby.

The rendering of lever 210 effective and ineffective as a reactant member for the bail 205A is a function of the position of a hooked control finger 213 pivotally mounted on the frame 69 and adapted to move into overlying limiting relation to an eccentric stud 214 on the lever 210. The finger 213 extends downward through an opening 214A (Fig. 12) in the frame 69 and pivots upon a stud 215 projecting from an outstruck portion 216 (Fig. 8) of the frame. Below the pivot stud 215 a tension spring 217 is connected to the finger 213 and urges the finger in a counter-clockwise direction to the normal position of Fig. 15. With the finger 213 so positioned the stud 214 is free of the finger and the lever 210 may move with the yoke 183. Motion of the finger to the restraining position of Fig. 10, however, prevents the lever 210 from following upward motion of the yoke and so allows the lever to serve as a reactant member as previously described. Such movement of the finger 213 is accomplished through a link 218 interconnecting the finger and the plunger 219 of an electromagnetic solenoid 221. Energizing of the solenoid 221 draws the plunger 219 inward, and, acting through link 218, shifts the finger 213 to the position of Fig. 10.

As shown in Fig. 17, the solenoid 221 is connected by leads 222 and 223 across the primary conductors 113 and 114, there being also interposed in the leads 222 and 223 a switch 224. The switch 224 is mounted in the register (Fig. 2) and is a normally open microswitch adapted to be closed by the flexing of a leaf spring 225 operated by the head of a set screw 226 placed in the pin wheel shaft 42. Once each revolution of the shaft 42, therefore, the switch 224 is closed and the solenoid 221 is energized to draw link 218 and finger 213 rearwardly. While the energizing of the solenoid 221 is only a momentary matter, the link 218 and finger 213 are held actuated by a latch 227 slidably mounted on the frame 69 (see Figs. 5 and 13) and urged by a spring 228 (Fig. 16) toward contact with the link 218 where it is allowed to engage a cut out portion 229 in the lower edge of the link. A cam surface 231 on the latch 227 is engaged by a stud 232 on the slide 144 (Fig. 15) upon each reciprocation thereof to disable the latch and release the finger 213 for return to its normal ineffective position.

The printing discs 189 project beneath the yoke 183 and overlie the platen cylinder 128, a set of lugs 191 on the discs being presented to be driven against a platen insert 182 as indicated in Fig. 13. The raising and lowering of the yoke 183 is effected under the control of a cam 233 on the shaft 76. A gradually ascending, sharply descending lobe 234 on cam 233 is cooperative with rollers 235 and 236 on respective levers 237 and 238 pivotally mounted on the shaft 184. The lever 237 is urged by a torque spring 239 (Fig. 10) on shaft 184 to engage the roller 235 with the cam 233, one end of the spring being anchored in an opening 241 in lever 237 and the other end bearing on a stud 242 on the lever 238. The stud 242 resists the action of the spring 239, however, the torque spring being overcome by a more powerful tension spring 243 anchored to an ear 244 on frame 69 and connected to another stud 245 on the lever 238. Motion of the arm 238 under the urging of spring 243 is limited by the engagement of stud 242 in a slot 246 in the lever 237. As a result, the lever 238 is normally held with its roller 236 out of contact with the cam 233. The levers 237 and 238 have respective projecting fingers 247 and 248 embracing a stub shaft 249 carried between the arms of yoke 183 and projecting on opposite sides thereof. Thus the cam lobe 234 is successively effective upon the rollers 235 and 236 to raise the yoke 183 to its elevated position of Fig. 12 and then to allow it to be moved rapidly downward by spring 243 for impact of the discs 189 upon the cylinder platen 128. After striking the cylinder the yoke rebounds and assumes a position as shown in Fig. 15 with the printing discs slightly clearing the cylinder, the yoke being urged to and retained in such position by a torque spring 251 (Fig. 6) wound on the shaft 184 and extending into underlying relation to the stub shaft 249. As the cam 233 returns to its normal position the yoke 183 is gradually raised to the intermediate position of Fig. 10 through a rocking of the lever 237 and 238 in a counter-clockwise direction.

In the particular description of structure there remains to be considered the mounting and feeding of an inked ribbon 252 (Figs. 6, 10 and 18), which is passed between the platen cylinder 128 and the printing discs 189 so that the impression of the discs may be transmitted to the intermediate ticket strip 118. The ribbon mechanism is installed on a perpendicular bracket 253 at the front of the machine and operates in response to the movements of a lever 250 connected to the toggle made up of links 141 and 142. Overthrow of the slide 144 as effected by cam 146 operates during each advancement of the cylinder 128 to draw lever 250 upwardly and rearwardly, as shown in Fig. 15, to impart an increment of feeding motion to the ribbon 252.

Referring to Figs. 12 and 20, one side of the plate 253 comprises a pair of mounting studs 254 for the track assembly, whereas the opposite side comprises the fixed bell crank pivot 255, a pair of pawl pivots 256, and a pair of spindle bearings 257 having the slide 258. The bell crank 259 which is pivotally mounted on the pivot 255 is provided with an elongated slot in the arm extending adjacent to the slide 258 for the engagement therein of the drive stud 261 thereon.

Shown in Figs. 10 and 20, the slide 258 further embodies a stud 262 carrying a pivotal support rocker 263 whose stud 264 is releasably engaged in a notch of the release rocker 265 also pivotally carried by another stud 267 on the slide 258.

Diametrically opposing the notch of the rocker 265 a stud 268 thereon secures one end of the extension spring 269, whose other end is attached to the anchor stud 271 on the drive pawl 272 pivotally carried by a stud 273 of the rocker 263 whose top end is notched wherein the stud 271 is arcuately moved.

The pair of studs 268—271 carrying the spring 269 project similarly on the opposite side of the pawl 272 and rocker 265 whereby another spring 269 is likewise mounted, thus effectively stabilizing the pawl 272, rocker 263 and rocker 265 against cocking tendency on their respective pivots, otherwise resulting from the exerted force of the single spring. Therefore by a dual arrangement, relative frictional hindrance of the closely associated members when pivoted is prevented.

The studs 256 pivotally support the detent pawls 274—275 each provided thereon with a release stud 276 for engagement with the inclined flats of the release rocker 265. Fixedly mounted on spindles 277 supported in the bearings 257 are respective ratchets 278—279, adjacent to the slide 258.

Referring to Figs. 5, 6, 10 and 18, therein is shown the ribbon track assembly embodied about the track frame 281 detachably mounted on the studs 254 by retaining latches as seen in Fig. 18 or preferably by manual screw knobs 282 in Fig. 10.

Hinged on the track frame 281 is the feed finger 283 to releasably guide the ticket strip best seen in Figs. 6, 15 and 18. Structurally contained on the track frame are a series of carrier studs 284 undercut to provide a track for the ribbon 252 thereon and additionally supported by a fixed pin 285 on each side of the portion notched for the hinged feed finger 283. The ribbon spools are mounted for complementary rotation on the cores 286 rotatively housed on the frame 281. Projecting exteriorly thereof are knurled ends of the spindles 277 supported in cores 286 and bearings 257. The spindles 277 are coupled with the cores 286 whereby rotation of either spindle manually will rotatively reverse the other. Similarly when the bell crank 259 (see Fig. 20) is pivoted by the lever 250 the slide 258 is shifted whereby either driver of the pawl 272 may advance the respective ratchet with progressive step-by-step intermittent movements, and the complementary ratchet will be reversed.

Incidental to general function of ribbon reversing mechanisms, depletion of one spool locks the spindles and ratchets against advancement, thereby preventing movement of the drive pawl 272. Thereupon the rocker 263 is pivoted relative to the slide 258 to thereby reposition the pawl 272 relative to the rocker 263 to engage the other driver of the pawl with its respective ratchet. However, in the altered relationship of the rocker 263, the pivotally reversed rocker 265 will consequently reverse the functional relationship of the anti-back-up or release pawl and in the subsequent operation of the machine the ribbon feed mechanism will be alternately governed at the depletion of the spools.

Removal of the frame 281 to replace the ribbon or for loading of the strips, is accomplished by releasing the latch 288 from the side as shown in Fig. 12, thereby permitting the lid to be raised backwardly.

It is thought that the general operation of the record making apparatus will be sufficiently clear from the preceding description of structure and mode of operation. To give a very general summary, however, after a form in the recording position of the register has been inscribed with appropriate indicia it is ejected or issued by operation of the crank 43. In the course of such motion the solenoid 221 in the ticket machine is energized and slide 218 and finger 213 are actuated thereby and held by latch 227. Now to issue one or more tickets from the machine 26, the control lever 107 thereof is pushed to initiate one or more cycles of the power shaft 76 and to energize solenoid 61 and thereby release the register for a subsequent operation. At the start of rotation of the shaft 76 the yoke 183 is raised from the Fig. 10 to the Fig. 12 position by cam 233 acting on roller 235. During this motion the bail 205A reacts on the held lever 210 and effects a unitary advance of or enters one digit in the reading of the printing discs 189. At or about the same time this occurs, the knife blade 164 moves from its Fig. 16 position to its Fig. 11 position and shortly thereafter the yoke 183 descends to print on the strip 118. After the printing yoke rebounds, the knife blade 164 is drawn fully out of locking engagement with the cylinder and at once begins a return stroke to cut off the printed portion of the strip and allow it to drop out through the front cover of the machine. In the intervening period, and in order to position the printed portion of the strip for cutting, the cylinder 128 is advanced by linkage including the slide 144 which also acts through its roller 232 to release the latch 227. By release of the latch 227, the mechanism for advancing the printing discs is in effect disabled until it is again conditioned for operation by rotation of the pin wheel shaft 42. Until it is so conditioned, the machine 26 will upon each cycle of its operation print duplicate numbered tickets.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. Record making apparatus, including an autographic register or like device operable upon consecutively numbered forms, means for issuing said forms seriatim, a ticket machine operable upon consecutively numbered tickets, means for issuing said tickets seriatim, a lock for preventing operation of said form issuing means, and means operating in response to operation of said ticket issuing means for releasing said lock.

2. Record making apparatus, including an autographic register or like device operable upon consecutively numbered forms, means for issuing said forms seriatim, a ticket machine operable upon consecutively numbered tickets, means for issuing said tickets seriatim and an interlock between said form issuing means and said ticket issuing means precluding issuance of a form from said register until said ticket issuing means has been operated to issue a ticket bearing a number corresponding to the number of the preceding form issued by said form issuing means.

3. Record making apparatus, including an autographic register or like machine, actuating means movable to effect issuance of record forms from the register, a latch for precluding operation of said actuating means, manual means for releasing said latch, settable means for preventing release of said latch, a ticket issuing machine, actuating means for said ticket issuing machine, and means operable by said last named actuating means for setting said settable means to effective and ineffective positions with respect to said latch.

4. Record making apparatus according to claim 3, wherein said register issues consecutively numbered forms and said ticket machine issues consecutively numbered tickets, characterized in that said ticket machine controls said settable means to preclude issuance of a form from said register until the ticket machine has issued a ticket corresponding in number to the number of the preceding form.

5. Record making apparatus, including an autographic register or like machine operable to issue record forms, means for actuating said register to issue record forms, a ticket issuing machine, printing mechanism in said ticket machine for printing progressively changing indicia on said tickets, and means operating in response to operation of said actuating means for progressively changing the indicia printed by said printing mechanism.

6. Record making apparatus, including an autographic register or like machine operable to issue consecutively numbered record forms, means for actuating said register to issue record forms, a ticket machine operable to issue tickets, a numerical printing mechanism in said ticket issuing machine for printing a number on each ticket issued, and means operating in response to operation of said actuating means for adjusting said printing mechanism to print a number corresponding to the number of the last preceding record form issued.

7. Record making apparatus, including an autographic register or like machine operable to issue consecutively numbered record forms, means for actuating said register to issue record forms, a ticket machine operable to issue tickets, a numerical printing mechanism in said ticket issuing machine for printing a number on each ticket issued and means operating in response to operation of said actuating means for effecting a regular numerical progression in the number printed by said printing mechanism upon the issuance of each record form.

8. Recording making apparatus according to claim 7, characterized by an interlock controlled by said ticket issuing machine for preventing issuance of a form by said register until said ticket machine has been operated to issue at least one ticket bearing a number corresponding to the number of the last preceding record form.

9. Record making apparatus, including an autographic register, means for issuing record forms from said register, a ticket machine presenting ticket issuing devices, a numerical printing mechanism for printing a number on each ticket issued, said mechanism including a shiftable printing frame and a series of number wheels carried thereby, said frame being shiftable to and from a printing position to print a number on said tickets corresponding to the number represented on said wheels, indexing apparatus responsive to motion of said frame for progressively changing the number represented on said wheels, a control part settable to render said indexing apparatus alternatively effective and ineffective, and means operating in response to the operation of said record form issuing means for setting said control part to render said indexing apparatus effective.

10. A ticket issuing machine, including a stationary supporting frame, a rotatable platen carried by said frame, said platen being formed with grooves extending lengthwise of the platen, a knife blade carried by said frame for pivotal swinging motion toward said platen, means for intermittently rotating said platen a distance bringing one of said grooves into line with said knife blade, means for intermittently swinging said knife blade toward said platen to cause said blade to enter a registering groove in said platen, said last named means providing a dwell of said blade in the grooves of said platen in which period said blade acts as a latch against rotation of said platen, and a continuous strip of ticket material advanced over said platen, the leading end thereof being progressively severed from the strip by the action of said knife blade.

11. A ticket issuing machine according to claim 10, characterized by a printing mechanism carried by said frame for intermittent pressural contact with the strip upon the platen, said platen being held against motion under contact by said printing mechanism by the latching action of said knife blade in a groove in said platen.

12. A ticket issuing machine, including a supporting frame, a rotatable platen carried by said frame, said platen being formed with spaced apart grooves extending lengthwise thereof, a continuous strip of ticket material arranged to be advanced over said platen in response to the rotation thereof, a printing mechanism supported on said frame for hammer blow imprinting of the strip upon said platen, and a knife blade carried by said frame for motion toward and from said platen, said blade being received in a groove in said platen to serve the dual function of cutting off the leading end of the strip and of locking the platen against movement during the imprinting operation.

13. A machine for printing and issuing tickets from a continuous strip of ticket material, including a platen, means for feeding the strip over said platen, a printing frame supported in overlying relation to said platen and movable toward the platen for hammer blow imprinting upon the strip, numerical printing wheels representing a plurality of denominational positions supported by said frame, an indexing apparatus for advancing the units denomination wheel through successive positions, a reactant member for said indexing apparatus tending to move with said printing frame to preclude operation of said indexing apparatus, and selectively operable means for holding said reactant member against motion with said printing frame.

14. Record making apparatus, including an autographic register or like machine operable to issue record forms, a lock for preventing a record form issuing operation of said register, a machine for printing and issuing tickets from a continuous strip of ticket material, including strip feeding, printing and severing devices, operating means for said devices including a power shaft and actuating cams on said shaft, a clutch plate secured to said shaft, an electric motor, means for selectively establishing a driving connection between said motor and said clutch plate including a shiftable control member having motion in first and second senses and normally held from motion in said second sense, manual means for moving said control member in a first sense to engage said clutch plate with said motor and for releasing said member for motion in said second sense, spring means urging said member to move in said second sense, and means utilizing motion of said control member in said second sense to release said register lock.

15. Record making apparatus, including an autographic register or like machine operable to issue record forms, actuating means operable to effect issuance of record forms from the register, a latch for precluding operation of said actuating means, manual means for releasing said latch, settable means for preventing release of said latch, a machine, for printing and issuing tickets from a continuous strip of ticket material, including strip feeding, severing and numerical printing devices, operating means for said devices including a power shaft and actuating cams on said shaft, an actuator for said shaft, a shiftable control member for operatively engaging and disengaging said actuator relatively to said shaft, means responsive to motion of said control member in one sense to set said settable means to allow release of said latch, indexing apparatus for progressively changing the number printed by said numerical printing device in response to each printing operation, a control part settable to render said indexing apparatus alternatively effective and ineffective, and means operable in response to the operation of issuing a record form for setting said control part to render said indexing apparatus effective.

16. Record making apparatus, including an autographic register and a ticket issuing machine, means for issuing record forms seriatim from said register, means for issuing tickets from said ticket machine seriatim, means for printing a number on each of said issued tickets, means for progressively changing the number printed on successively issued tickets, means operated by said record form issuing means for enabling said number changing means, and means operated by said ticket issuing means for disabling said number changing means.

17. Record making apparatus according to claim 16, characterized by a lock for said record forms issuing means disabled by operation of said ticket issuing means and enabled by operation of said record forms issuing means.

18. Record making apparatus, including an autographic register and a ticket imprinting and issuing machine arranged side by side for conjoint use by an operator, manual controls respectively on said register and on said machine for causing said register to issue record forms and said machine to imprint and issue tickets, means for changing indicia imprinted on the tickets and automatic interacting devices between said register and said machine making the issuing of record forms by said register dependent upon an intervening operation of said ticket imprinting and issuing machine and making a change in the indicia printed on the tickets by the imprinting machine subject to an intervening record form issuing operation by said register.

19. Record making apparatus, including an autographic register and a ticket imprinting and issuing machine arranged side by side for conjoint use by a single operator, locking means effective to prevent a succeeding operation of said register, responsive to a register operating cycle an imprinting adjustment control in said ticket machine for serially changing the indicia printed on the tickets issued by said machine, means making the release of said locking means dependent upon an intervening operation of the ticket imprinting and issuing machine, and means making a change in said imprinting adjustment control dependent upon an intervening operation of said register.

References Cited in the file of this patent

UNITED STATES PATENTS

| Number | Name | Date |
|---|---|---|
| 568,454 | Norcross | Sept. 29, 1896 |
| 714,228 | Ohmer | Nov. 25, 1902 |
| 983,872 | Brown | Feb. 14, 1911 |
| 1,090,543 | Jung | Mar. 17, 1914 |
| 1,129,279 | Donner | Feb. 23, 1915 |
| 1,560,866 | Sherman | Nov. 10, 1925 |
| 1,685,532 | Bechman | Sept. 25, 1928 |
| 1,938,815 | Du Grenier | Dec. 12, 1933 |
| 1,956,300 | Putnam | Apr. 24, 1934 |
| 1,986,212 | Mahon | Jan. 1, 1935 |
| 2,102,651 | Sherman | Dec. 21, 1937 |
| 2,112,833 | Dybvig | Apr. 5, 1938 |
| 2,119,684 | Paden | June 7, 1938 |
| 2,304,386 | Vahle | Dec. 8, 1942 |
| 2,310,179 | Kohnle | Feb. 2, 1943 |
| 2,312,340 | Kilpatrich | Mar. 2, 1943 |
| 2,427,515 | Swain | Sept. 16, 1947 |
| 2,432,014 | Harrington | Dec. 2, 1947 |
| 2,464,561 | Dickinson | Mar. 15, 1949 |
| 2,482,420 | Keuper | Sept. 20, 1949 |
| 2,485,002 | Krueger | Oct. 18, 1949 |
| 2,515,354 | Osborne | July 18, 1950 |
| 2,526,004 | Carothers | Oct. 17, 1950 |
| 2,528,740 | Carothers | Nov. 7, 1950 |
| 2,531,644 | Rayburn | Nov. 28, 1950 |
| 2,682,833 | Gardinor | July 6, 1954 |